United States Patent [19]

Choi et al.

[11] Patent Number: 5,532,831
[45] Date of Patent: Jul. 2, 1996

[54] RECORDING APPARATUS AND METHOD FOR A HIGH DEFINITION VIDEO CASSETTE RECORDER

[75] Inventors: Man C. Choi; Soo K. Kim; Je H. Lee; Tae S. Yang; Sang J. Woo, all of Seoul, Rep. of Korea

[73] Assignee: Goldstar Company, Ltd., Seoul, Rep. of Korea

[21] Appl. No.: 208,302

[22] Filed: Mar. 10, 1994

[30] Foreign Application Priority Data

| Mar. 19, 1993 | [KR] | Rep. of Korea | 4086/1993 |
| Mar. 19, 1993 | [KR] | Rep. of Korea | 4229/1993 |
| Apr. 3, 1993 | [KR] | Rep. of Korea | 5653/1993 |

[51] Int. Cl.$^6$ ............................ H04N 5/76; H04N 5/92
[52] U.S. Cl. ..................... 358/335; 360/9.1; 360/25
[58] Field of Search ............................ 360/25, 27, 33.1, 360/61, 9.1; 358/310, 335, 313; H04N 5/76, 5/92

[56] References Cited

U.S. PATENT DOCUMENTS

| 4,811,122 | 3/1989 | Kido et al. | 360/25 |
| 5,136,391 | 8/1992 | Minami | 358/310 |
| 5,255,101 | 10/1993 | Okada | 358/340 |
| 5,327,173 | 7/1994 | Nishizawa et al. | 348/412 |

Primary Examiner—Thai Q. Tran
Assistant Examiner—Y. Lee

[57] ABSTRACT

A recording apparatus for a high definition video cassette recorder, comprises a tape discriminator for checking for the presence of a hole on a specified position of a tape to discriminate whether the tape is of the normal-VHS type or the super-VHS type, a clock signal generator for generating a clock signal of a desired period in response to an output signal from the tape discriminator, a frequency divider for frequency-dividing the clock signal from the clock signal generator by an integer N, a first switch for selecting either the clock signal from the clock signal generator or the frequency divided clock signal in response to the output signal from the tape discriminator, a video data separator for separating intra-frame data and inter-frame data from an input digital video signal in response to the clock signal selected by the first switch and outputting the separated intra-frame data, a second switch for selecting either the input digital video signal or the intra-frame data from the video data separator in response to the output signal from the tape discriminator, a video data formatter for formatting an output signal from the second switch in response to the clock signal from the first switch and the output signal from the tape discriminator, a recording amplifier for amplifying an output signal from the video data formatter, and a head for recording an output signal from the recording amplifier on the tape.

22 Claims, 3 Drawing Sheets

RECORDING APPARATUS AND METHOD FOR A HIGH DEFINITION VIDEO CASSETTE RECORDER

BACKGROUND OF THE INVENTION

1. Field of the Invention

The present invention relates in general to high definition video cassette recorders, and more particularly to a recording apparatus and a method of recording for a high definition video cassette recorder (referred to hereinafter as a high definition VCR), in which a digital video signal can be recorded on an existing normal-VHS tape by recording only the intra-frame data of the digital video signal on the normal-VHS tape.

2. Description of the Background Art

Generally, a digital video signal is recorded at a frequency of about 7–8 MHz on a super-VHS tape and an analog video signal is recorded at a frequency of about 4–5 MHz on a normal-VHS tape. For this reason, when an input video signal is analog, it is recorded only on the normal-VHS tape. On the contrary, when the input video signal is digital, it is recorded only on the super-VHS tape. In this connection, an analog VCR is required to play back the analog video signal recorded on the normal-VHS tape, whereas a high definition VCR is required to play back the digital video signal recorded on the super-VHS tape.

Namely, the digital video signal cannot be recorded on the normal-VHS tape because of a the difference between the recording frequencies of the super-VHS tape and the normal-VHS tape.

On the other hand, the recording time of the digital video signal on the super-VHS tape is about 2 hours. Extension of the recording time is enabled by reducing a track width of the tape. In this case, the digital video signal is limited in recording frequency band, resulting in a degradation in picture quality.

SUMMARY OF THE INVENTION

Therefore, the present invention has been made in view of the above problems, and it is an object of the present invention to provide a recording apparatus for a high definition VCR in which a digital video signal can be recorded on a normal-VHS tape by recording only the intra-frame data of the digital video signal on the normal-VHS tape.

It is another object of the present invention to provide a recording apparatus for a high definition VCR in which the recording time of a digital video signal can be extended by recording only the intra-frame data of the digital video signal on a super-VHS tape.

In accordance with the present invention, the above and other objects can be accomplished by a provision of a recording apparatus for a high definition video cassette recorder, comprising tape discrimination means for checking for the presence of a hole on a specified position of a tape to discriminate whether the tape is of the normal-VHS type or the super-VHS type; clock signal generation means for generating a clock signal of a desired period in response to an output signal from said tape discrimination means; frequency division means for frequency-dividing the clock signal from said clock signal generation means by an integer N; first switching means for selecting between the clock signal from said clock signal generation means and the frequency-divided clock signal from said frequency division means in response to the output signal from said tape discrimination means; video data separation means constructed to detect frame data of the original digital video signal inputted per input clock signals received from said first switching means, for separating intra-frame data and inter-frame data from an input digital video signal in response to the clock signal selected by said first switching means and outputting the separated intra-frame data; second switching means for selecting between the input digital video signal and the intra-frame data from said video data separation means in response to the output signal from said tape discrimination means; video data formatting means for formatting an output signal from said second switching means in response to the clock signal from said first switching means and the output signal from said tape discrimination means; recording amplification means for amplifying an output signal from said video data formatting means by an amplification degree which is determined by the output signal from said tape discrimination means; and a head for recording an output signal from said recording amplification means on the tape.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the from this detailed description.

BRIEF DESCRIPTION OF THE DRAWINGS

The above and other objects, features and advantages of the present invention will be more clearly understood from the following detailed description taken in conjunction with the accompanying drawings which are given by way of illustration only, and thus are not limitative of the present invention; in which.

DETAILED DESCRIPTION OF THE PREFERRED EMBODIMENTS

Figure 1:
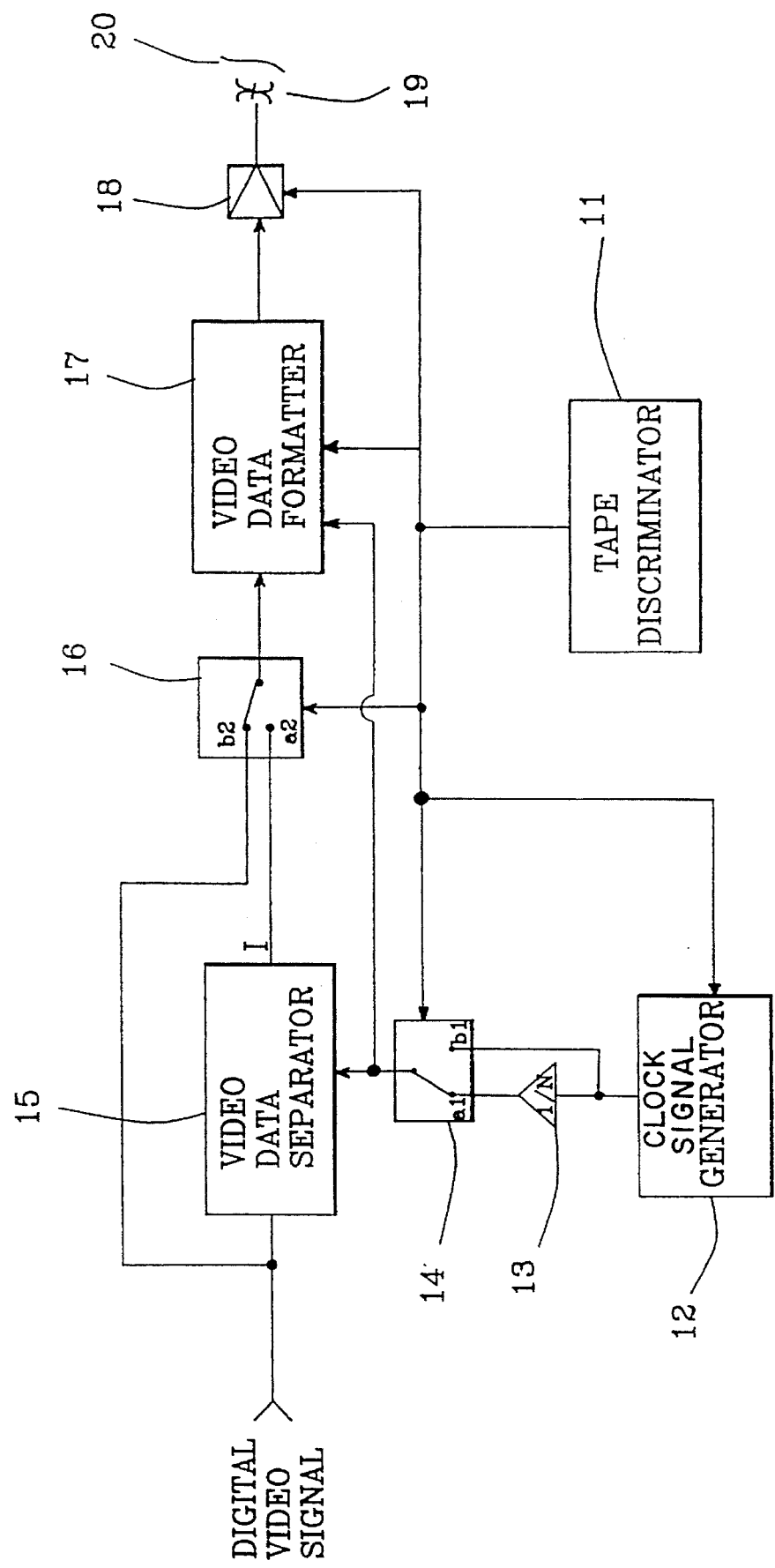
FIG. 1 is a block diagram of a recording apparatus for a high definition VCR in accordance with an embodiment of the present invention.

Referring to FIG. 1, there is shown a block diagram of a recording apparatus for a high definition VCR in accordance with an embodiment of the present invention. As shown in this drawing, the recording apparatus comprises a tape discriminator 11 for checking for the presence of a hole on a specified position of a tape 20 to discriminate whether the tape 20 is of the normal-VHS type or the super-VHS type, a clock signal generator 12 for generating a clock signal of a desired period in response to an output signal from the tape discriminator 11, a frequency divider 13 for frequency-dividing the clock signal from the clock signal generator 12 by an integer N, and a first switch 14 for selecting a clock signal from the clock signal generator 12 and the frequency-divided clock signal from the frequency divider 13 in response to the output signal from the tape discriminator 11.

A video data separator 15 is operated responsive to the clock signal selected by the first switch 14, to separate intra-frame data I and inter-frame data P from an input digital video signal and output the separated intra-frame data I.

A second switch 16 is also provided in the recording apparatus to select either the input digital video signal or the intra-frame data I from the video data separator 15 in response to the output signal from the tape discriminator 11.

A video data formatter 17 is also provided in the recording apparatus to format an output signal signal selected by the second switch 16 in response to the clock signal from the first switch 14 and the output signal from the tape discriminator 11.

Also, the recording apparatus comprises a recording amplifier 18 for amplifying an output signal from the video data formatter 17 by an amplification degree which is determined by the output signal from the tape discriminator 11, and a head 19 for recording an output signal from the recording amplifier 18 on the tape 20.

The operation of the recording apparatus for the high definition VCR with the above-mentioned construction in accordance with the embodiment of the present invention will hereinafter be described in detail.

First, the description will be made to the case where the tape 20 is of the normal-VHS type.

The tape discriminator 11 checks for the presence of a hole on the specified position of the tape 20. Upon discriminating that the tape 20 is of the normal-VHS type, the tape discriminator 11 outputs a corresponding signal. The output signal from the tape discriminator 11 is applied to the clock signal generator 12. The clock signal generator 12 generates a clock signal of a desired period in response to the output signal from the tape discriminator 11.

The clock signal from the clock signal generator 12 is frequency-divided by an integer N by the frequency divider 13. The output signal from the tape discriminator 11 is also applied to the first switch 14. As a result, the N-frequency-divided clock signal from the frequency divider 13 is transferred to the video data separator 15 through a contact a1 of the first switch 14 switched in response to the output signal from the tape discriminator 11.

Also, the input digital video signal is applied to the video data separator 15. The video data separator 15 separates the intra-frame data I and the inter-frame data P from the input digital video signal in response to the clock signal elected by the first switch 14 and applies the separated intra-frame data I to a contact a2 of the second switch 16. At this time, because a movable contact of the second switch 16 is connected to the contact a2 in response to the output signal from the tape discriminator 11, the intra-frame data I from the video data separator 15 is transferred to the video data formatter 17 through the contact a2 of the second switch 16. Subsequently, the video data formatter 17 formats the intra-frame data I from the video data separator 15 in response to the clock signal applied through the contact a1 of the first switch 14.

In formatting the intra-frame data I, dummy frame data is inserted to maintain a ratio of the original video data.

Figure 2:
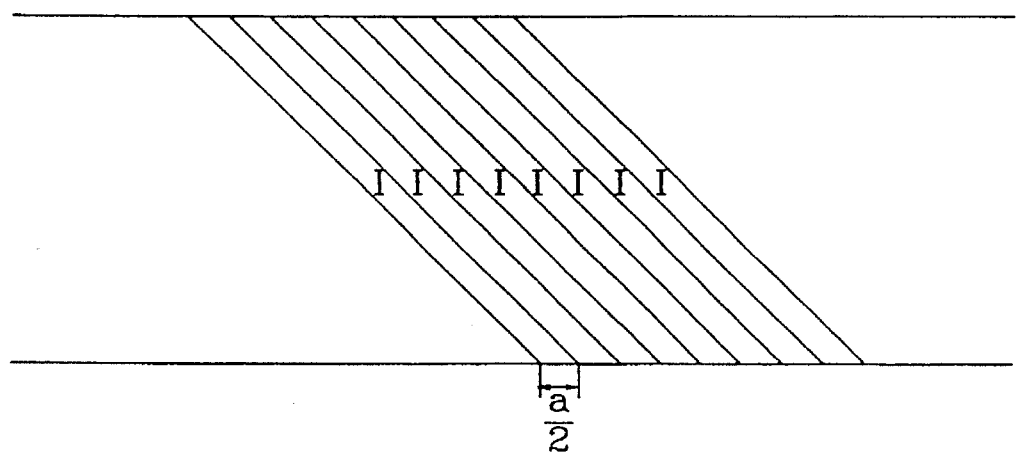
FIG. 2 is a view illustrating a recording state of a digital video signal on a normal-VHS tape in accordance with the embodiment of the present invention.

The output signal from the video data formatter 17 is amplified by the recording amplifier 18 by the amplification degree which is determined by the output signal from the tape discriminator 11. Then, the output signal from the recording amplifier 18 is recorded as shown in FIG. 2 on the tape 20 by the head 19.

Next, the description will be made to the case where the tape 20 is of the super-VHS type.

The tape discriminator 11 checks for the presence of a hole on the specified position of the tape 20. Upon discriminating that the tape 20 is of the super-VHS type, the tape discriminator 11 outputs a corresponding signal. The output signal from the tape discriminator 11 is applied to the first and second switches 14 and 16, thereby causing the movable contacts of the first and second switches 14 and 16 to be connected to contacts b1 and b2, respectively. The input digital video signal is applied to the contact b2 of the second switch 16.

The output signal from the tape discriminator 11 is also applied to the clock signal generator 12. The clock signal generator 12 generates a clock signal of a desired period in response to the output signal from the tape discriminator 11. The clock signal from the clock generator 12 is transferred to the video data formatter 17 through the contact b1 of the first switch 14 switched in response to the output signal from the tape discriminator 11.

Also, because the movable contact of the second switch 16 is connected to the contact b2 thereof in response to the output signal from the tape discriminator 11, the input digital video signal is directly transferred to the video data formatter 17 through the contact b2 of the second switch 16. As a result, the video data formatter 17 formats the input digital video signal in response to the clock signal applied through the contact b1 of the first switch 14.

Figure 3:
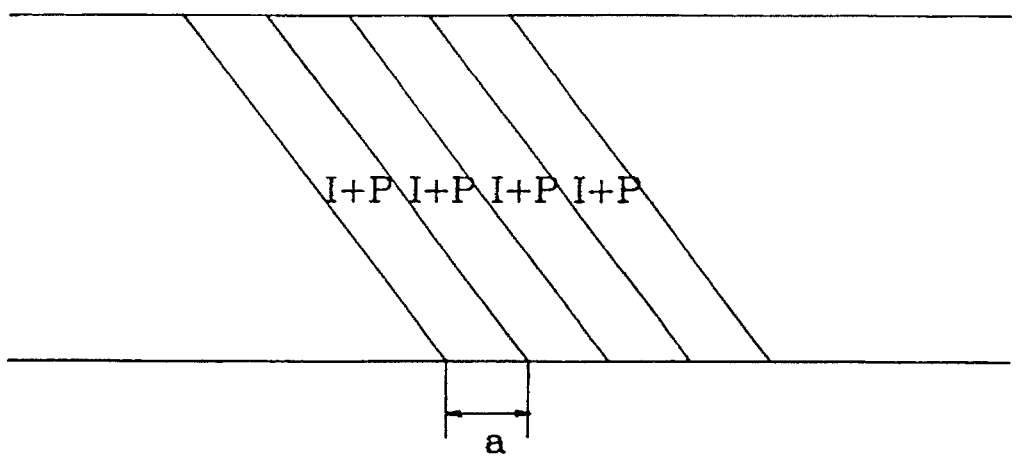
FIG. 3 is a view illustrating a recording state of the digital video signal on a super-VHS tape in accordance with the embodiment of the present invention.

The output signal from the video data formatter 17 is amplified by the recording amplifier 18 by the amplification degree which is determined by the output signal from the tape discriminator 11. Then, the output signal from the recording amplifier 18 is recorded as shown in FIG. 3 on the tape 20 by the head 19.

Figure 4:
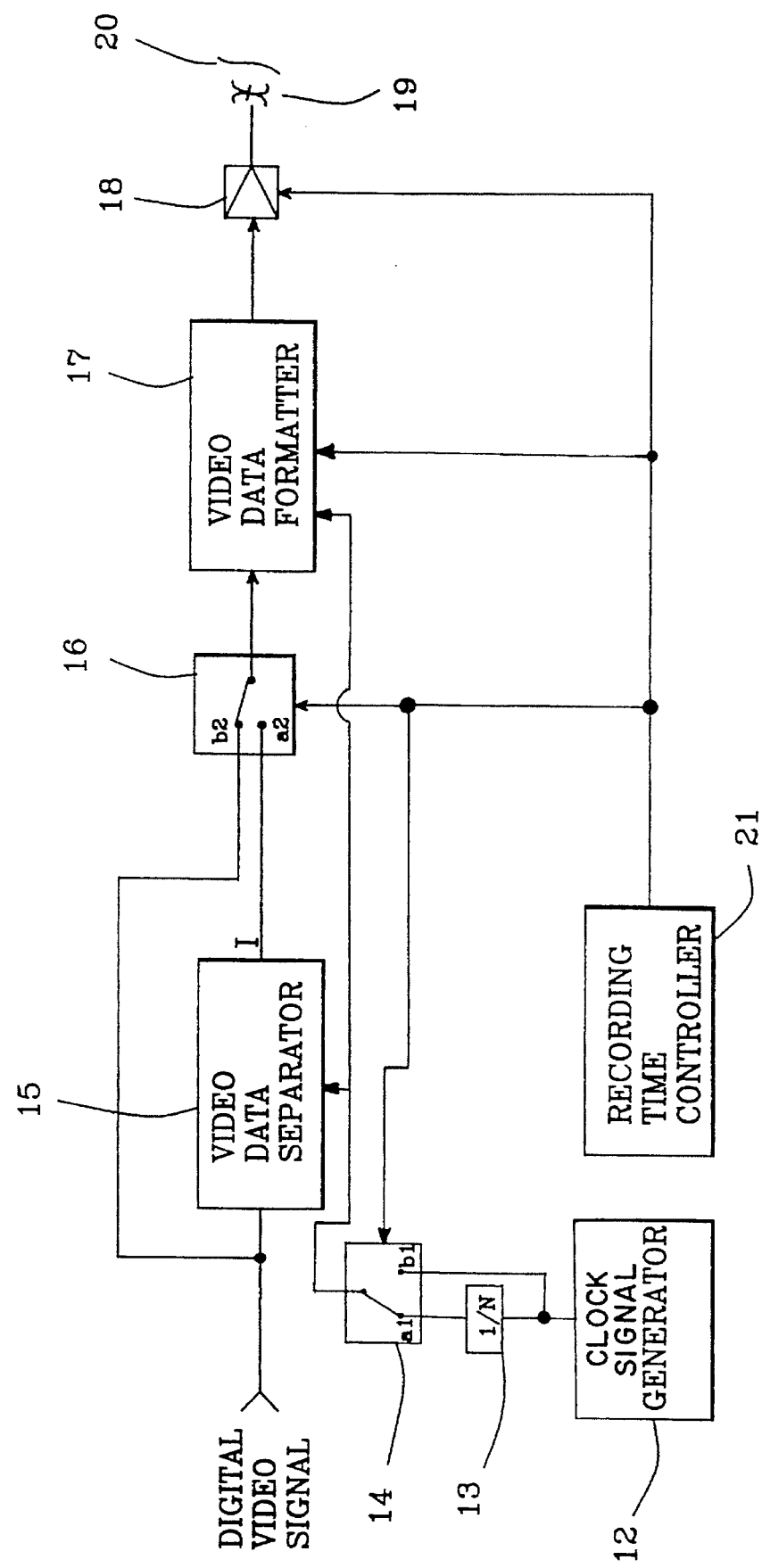
FIG. 4 is a block diagram of a recording apparatus for a high definition VCR in accordance with an another embodiment of the present invention.

Referring to FIG. 4, there is shown a block diagram of a recording apparatus for a high definition VCR in accordance with an another embodiment Of the present invention. The construction of this drawing is substantially the same as that of FIG. 1, with the exception that a recording time controller 21 is employed instead of the tape discriminator 11 in FIG. 1. The recording time controller 21 is adapted to output a control signal to control the recording time of the input digital video signal according to a recording mode selected by the user.

The operation of the recording apparatus for the high definition VCR with the above-mentioned construction in accordance with the another embodiment of the present invention will hereinafter be described in detail.

First, the description will be made to the case where a standard recording mode SP is selected by the user.

If the standard recording mode SP is selected by the user, the movable contacts of the first and second switches 14 and 16 are connected to the contacts b 1 and b2 respectively, in response to the control signal generated by the recording time controller 21. As a result, the clock signal from the clock signal generator 12 and the input digital video signal are applied to the video data formatter 17 through the contact b1 of the first switch 14 and the contact b2 of the second switch 16, respectively. Then, the video data formatter 17 formats the input digital video signal in response to the clock signal applied through the contact b1 of the first switch 14.

The output signal from the video data formatter 17 is amplified by the recording amplifier 18 and then recorded on the tape 20 by the head 19.

On the other hand, in the case where any other mode LP or EP other than the standard recording mode SP is selected by the user, the movable contacts of the first and second switches 14 and 16 are connected to the contacts a1 and a2 respectively, in response to the control signal from the recording time controller 21.

The clock signal from the clock signal generator 12 is frequency-divided by an integer N by the frequency divider 13 and then transferred to the video data separator 15 through the contact a1 of the first switch 14.

Also, the input digital video signal is applied to the video data separator 15. The video data separator 15 separates the intra-frame data I and the inter-frame data P from the input digital video signal in response to the clock signal selected by the first switch 14 and applies the separated intra-frame data I to the contact a2 of the second switch 16.

The intra-frame data I from the video data separator 15 is transferred to the video data formatter 17 through the contact a2 of the second switch 16. Subsequently, the video data formatter 17 formats the intra-frame data I from the video data separator 15 in response to the clock signal applied through the contact a 1 of the first switch 14.

In formatting the intra-frame data I, the dummy frame data is inserted to maintain the ratio of the original video data.

The output signal from the video data formatter 17 is amplified by the recording amplifier 18 and then recorded on the tape 20 by the head 19.

As apparent from the above description, according to the present invention, the digital video signal can be recorded on the tape, being either of the normal-VHS or super-VHS type. Also, only the intra-frame data of the digital video signal is recorded on the tape according to a recording mode selected by the user. Therefore, the digital video signal is not limited to a recording frequency. This has the effect of increasing a picture quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed:

1. A recording apparatus for a high definition video cassette recorder, comprising:

tape discrimination means for discriminating whether a tape is of a normal-VHS type or a super-VHS type;

clock signal generation means for generating a clock Signal of a desired period in response to an output signal from said tape discrimination means;

frequency division means for frequency-dividing the clock signal from said clock signal generation means by an integer;

first switching means for selecting between the clock signal from said clock signal generation means and the frequency-divided clock signal from said frequency division means in response to the output signal from said tape discrimination means;

video data separation means for separating intra-frame data and inter-frame data from an input digital video signal in response to the clock signal selected by said first switching means and outputting the separated intra-frame data;

second switching means for selecting between the input digital video signal and the intra-frame data from said video data separation means in response to the output signal from said tape discrimination means;

video data formatting means for formatting an output signal from said second switching means in response to the clock signal selected by said first switching means and the output signal from said tape discrimination means; and recording means for recording on the tape an output signal from said data formatting means.

2. A recording apparatus for a high definition video cassette recorder, as set forth in claim 1, wherein recording time control means is replaced for said tape discrimination means, said recording time control means controlling said first and second switching means according to a recording mode selected by a user.

3. A recording apparatus for a high definition video cassette recorder, as set forth in claim 1, wherein said video data separation means detects frame data of the digital video signal per the clock signal output from said first switching means.

4. A recording apparatus for a high definition video cassette recorder, as set forth in claim 1, wherein said tape discrimination means discriminates the tape by checking for a presence of a hole on a specified position of the tape.

5. A recording apparatus for a high definition video cassette recorder, as set forth in claim 1, wherein when the tape is discriminated to be the normal-VHS type, the frequency-divided clock signal from said frequency division means and the intra-frame data from said video data separation means are selected by said first and second switching means, respectively.

6. A recording apparatus for a high definition video cassette recorder, as set forth in claim 1, wherein when the tape is discriminated to be the super-VHS type, the clock signal from said clock signal generation means and the input digital video signal are selected by said first and second switching means, respectively.

7. A recording apparatus for a high definition video cassette recorder, as set forth in claim 1, wherein the output signal from said tape discrimination means is based on the discrimination result, and said video data formatting means inserts dummy frame data when formatting the intra-frame data.

8. A recording apparatus for a high definition video cassette recorder, as set forth in claim 1, wherein said recording means includes a recording amplifier for amplifying an output signal from said video data formatting means by an amplification degree, and a head for recording on the tape an output signal from said recording amplifier, said amplification degree being determined by the output signal from said tape discrimination means.

9. A recording apparatus for a high definition video cassette recorder, as set forth in claim 2, wherein when a first recording mode is selected by the user, said first and second switching means select the clock signal from said clock signal generation means and the input digital video signal, respectively.

10. A recording apparatus for a high definition video cassette recorder, as set forth in claim 2, wherein when a second recording mode is selected by the user, said first and second switching means select the frequency-divided clock signal from said frequency division means and the intra-frame data from said video data separation means, respectively.

11. A recording device for a high definition video cassette recorder, comprising:

clock signal generation means for generating a first clock signal having a predetermined period and a second clock signal determined by frequency-dividing the first clock signal;

first switching means for selecting between the first and second clock signals;

video data separation means for generating either an input digital video signal or intra-frame data separated from the input digital video signal;

second switching means for selecting between the input digital video signal and the intra-frame data from said video data separation means;

video data formatting means for formatting an output signal from said second switching means in response to the clock signal selected by said first switching means for recording; and recording time control means for controlling said first switching means, said second switching means, and said video data formatting means.

12. A recording apparatus for a high definition video cassette recorder, as set forth in claim 11, further comprising:

recording amplification means for amplifying an output signal from said video data formatting means by an amplification degree which is determined by an output signal from said record time control means; and a head for recording on the tape an output signal from said recording amplification means.

13. A recording apparatus for a high definition video cassette recorder, as set forth in claim 11, wherein said recording time control means controls according to a recording mode selected by a user.

14. A recording apparatus for a high definition video cassette recorder, as set forth in claim 12, wherein when a first recording mode is selected by the user, said first and second switching means select the first clock signal and the input digital video signal, respectively.

15. A recording apparatus for a high definition video cassette recorder, as set forth in claim 12, wherein when a second recording mode is selected by the user, said first and second switching means select the second clock signal and the intra-frame data, respectively.

16. A recording apparatus for a high definition video cassette recorder, comprising:

tape discrimination means for discriminating whether a tape is a normal-VHS type or a super-VHS type:

clock signal generation means for generating a first clock signal and a second clock signal by frequency-dividing the first clock signal;

video data separation means for generating either an input digital video signal or intra-frame data separated from the input digital video signal;

switching means for selecting between the first and second clock signals and between the input digital video signal and the intra-frame data, in accordance with the discrimination result from said tape discrimination means; and video data formatting means for formatting an output signal from said switching means and recording the formatted output signal on the tape.

17. A method of recording a video data on a tape for a high definition video cassette recorder, comprising the steps of:

discriminating whether the tape is a normal-VHS type or a super-VHS type:

generating a first clock signal having a predetermined period and a second clock signal by frequency-dividing the first clock signal;

separating intra-frame data signal from an input digital video signal;

selecting between the first and second clock signals and between the input digital video signal and the intra-frame data signal, in accordance with the discrimination result from said discriminating step;

formatting the input digital video signal or the intra-frame data signal based on the selection made in said selecting step; and recording the formatted signal generated in said formatting step.

18. A method of recording, as set forth in claim 17, wherein when the tape is discriminated to be the super-VHS type, the first clock signal and the input digital video signal are selected in said selecting step.

19. A method of recording, as set forth in claim 17, wherein when the tape is discriminated to be the normal-VHS type, the second clock signal and the separated intra-frame data are selected in said selecting step.

20. A method of recording a video data on a tape for a high definition video cassette recorder, comprising the steps of:

determining a recording mode selected by a user and generating an output signal based on the determination:

generating a first clock signal having a predetermined period and a second clock signal by frequency-dividing the first clock signal;

separating intra-frame data signal from an input digital video signal;

selecting between the first and second clock signals and between the input digital video signal and the intra-frame data signal, in accordance with the output signal generated in said determining step;

formatting the input digital video signal or the intra-frame data signal based on the selection made in said selecting step; and recording the formatted signal generated in said formatting step.

21. A method of recording, as set forth in claim 20, wherein if the recording mode is determined to be a first recording mode, the first clock signal and the input digital video signal are selected in said selecting step.

22. A method of recording, as set forth in claim 20, wherein if the recording mode is determined to be a second recording mode, the second clock signal and the separated intra-frame data are selected in said selecting step.

* * * * *